US012651804B2

(12) United States Patent
Jin et al.

(10) Patent No.: US 12,651,804 B2
(45) Date of Patent: Jun. 9, 2026

(54) BATTERY MODULE AND MANUFACTURING METHOD OF THE SAME

(71) Applicant: LG ENERGY SOLUTION, LTD., Seoul (KR)

(72) Inventors: Heejun Jin, Daejeon (KR); Ho June Chi, Daejeon (KR); Jin Yong Park, Daejeon (KR); Jeong Oh Moon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 564 days.

(21) Appl. No.: 18/032,272

(22) PCT Filed: Feb. 23, 2022

(86) PCT No.: PCT/KR2022/002667
§ 371 (c)(1),
(2) Date: Apr. 17, 2023

(87) PCT Pub. No.: WO2022/182136
PCT Pub. Date: Sep. 1, 2022

(65) Prior Publication Data
US 2023/0395946 A1      Dec. 7, 2023

(30) Foreign Application Priority Data

Feb. 23, 2021    (KR) ........................ 10-2021-0024301
Feb. 22, 2022    (KR) ........................ 10-2022-0023214

(51) Int. Cl.
  H01M 50/503          (2021.01)
  H01M 50/211          (2021.01)
        (Continued)

(52) U.S. Cl.
  CPC ....... H01M 50/503 (2021.01); H01M 50/211 (2021.01); H01M 50/507 (2021.01); H01M 50/516 (2021.01)

(58) Field of Classification Search
  CPC ............. H01M 50/209; H01M 50/211; H01M 50/502; H01M 50/503
  See application file for complete search history.

(56) References Cited

U.S. PATENT DOCUMENTS

2008/0124617 A1    5/2008  Bjork
2016/0233476 A1    8/2016  Okamoto et al.
        (Continued)

FOREIGN PATENT DOCUMENTS

CN      202817122 U      3/2013
CN      105244467 A      1/2016
        (Continued)

OTHER PUBLICATIONS

International Search Report (PCT/ISA/210) issued in PCT/KR2022/002667, dated Jun. 7, 2022.
        (Continued)

*Primary Examiner* — Kevin E Yoon
(74) *Attorney, Agent, or Firm* — Birch, Stewart, Kolasch & Birch, LLP

(57)          ABSTRACT

A battery module according to an embodiment of the present disclosure includes a battery cell stack in which a plurality of battery cells including an electrode lead are stacked; and a lead frame located on one side of the battery cell stack. A first electrode lead protruding from a first battery cell among the plurality of battery cells and a second electrode lead protruding from a second battery cell among the plurality of battery cells are bent after passing through a slit formed in the lead frame and then overlapped to form an electrode lead assembly. In the electrode lead assembly, at least a part of the
        (Continued)

first electrode lead and at least a part of the second electrode lead are joined to each other. The lead frame includes a first support part on which the electrode lead assembly is located. The first support part has a shape that is protruded in a direction in which the electrode lead assembly is located or a shape that is recessed in a direction opposite to the direction in which the electrode lead assembly is located. At least a part of the electrode lead assembly is in close contact with one surface of the first support part.

18 Claims, 19 Drawing Sheets

(51) Int. Cl.
| | |
|---|---|
| *H01M 50/502* | (2021.01) |
| *H01M 50/507* | (2021.01) |
| *H01M 50/516* | (2021.01) |

(56) References Cited

U.S. PATENT DOCUMENTS

| | | |
|---|---|---|
| 2017/0331097 A1 | 11/2017 | Lee et al. |
| 2019/0267603 A1 | 8/2019 | Chi et al. |
| 2019/0372083 A1 | 12/2019 | Ryu et al. |
| 2020/0259158 A1 | 8/2020 | Motohashi et al. |
| 2021/0194101 A1 | 6/2021 | Kim et al. |

| | | |
|---|---|---|
| 2022/0123438 A1 | 4/2022 | Kim et al. |
| 2022/0149484 A1 | 5/2022 | Jeong et al. |
| 2022/0271404 A1 | 8/2022 | Chi et al. |

FOREIGN PATENT DOCUMENTS

| | | | | | |
|---|---|---|---|---|---|
| CN | 110429234 | A | 11/2019 | | |
| CN | 212161957 | U | 12/2020 | | |
| EP | 3 696 878 | A1 | 8/2020 | | |
| JP | 2015-56342 | A | 3/2015 | | |
| JP | 2016-119377 | A | 6/2016 | | |
| JP | 2019-67676 | A | 4/2019 | | |
| KR | 1020150062777 | A | * 6/2015 | .......... | H01M 50/502 |
| KR | 10-2016-0077765 | A | 7/2016 | | |
| KR | 10-2017-0032098 | A | 3/2017 | | |
| KR | 10-2017-0050508 | A | 5/2017 | | |
| KR | 10-2018-0119372 | A | 11/2018 | | |
| KR | 10-2007459 | B1 | 8/2019 | | |
| KR | 10-2077272 | B1 | 2/2020 | | |
| KR | 10-2020-0084450 | A | 7/2020 | | |
| KR | 10-2157377 | B1 | 9/2020 | | |
| KR | 10-2021-0000549 | A | 1/2021 | | |
| WO | WO 2019/050152 | A1 | 3/2019 | | |
| WO | WO-2019151716 | A1 | * 8/2019 | .......... | H01M 50/533 |
| WO | WO 2021/025374 | A1 | 2/2021 | | |

OTHER PUBLICATIONS

Extended European Search Report for European Application No. 22760052.5, dated Mar. 22, 2024.

* cited by examiner

【FIG. 1】            CONVENTIONAL ART
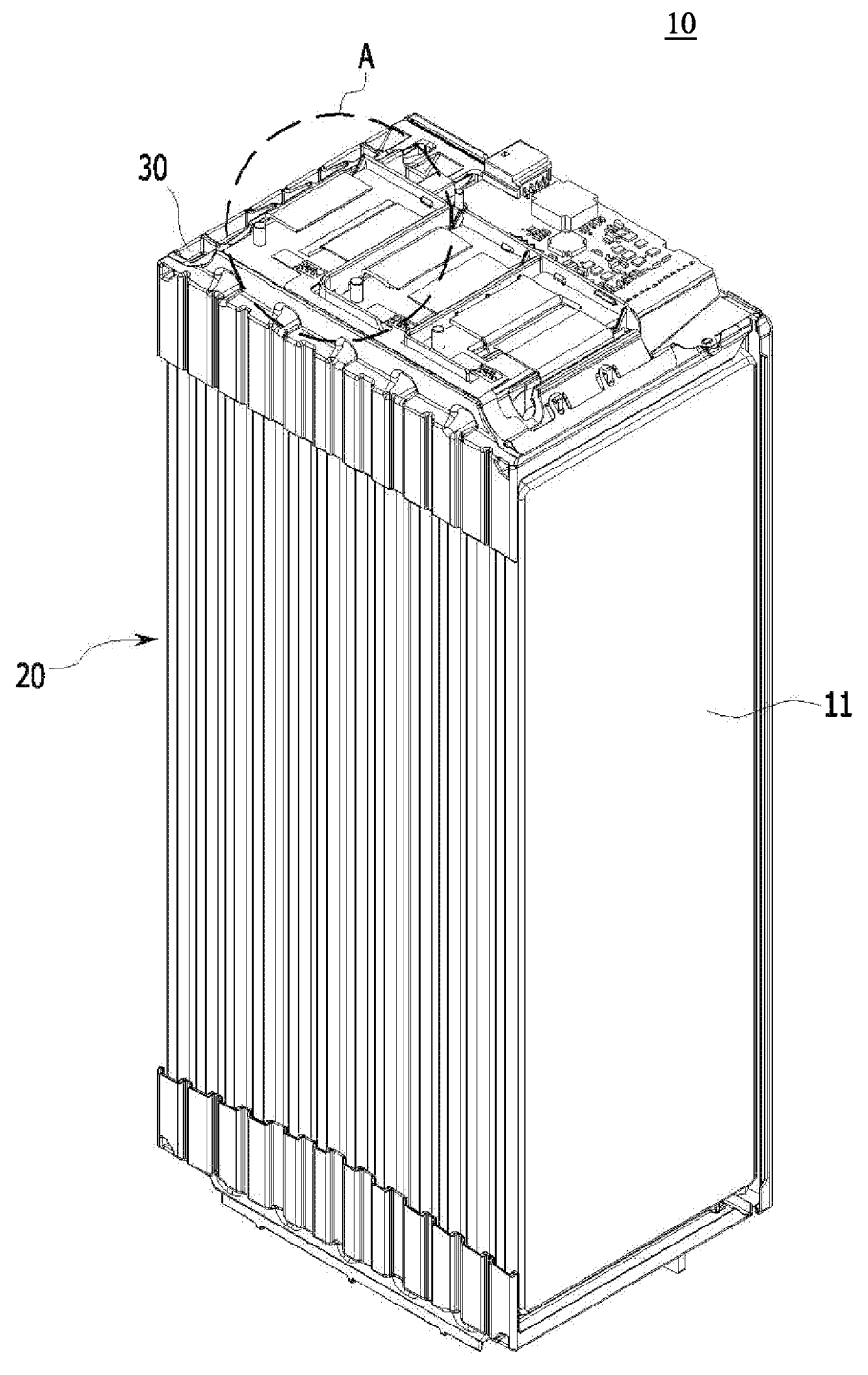

【FIG. 2】 CONVENTIONAL ART
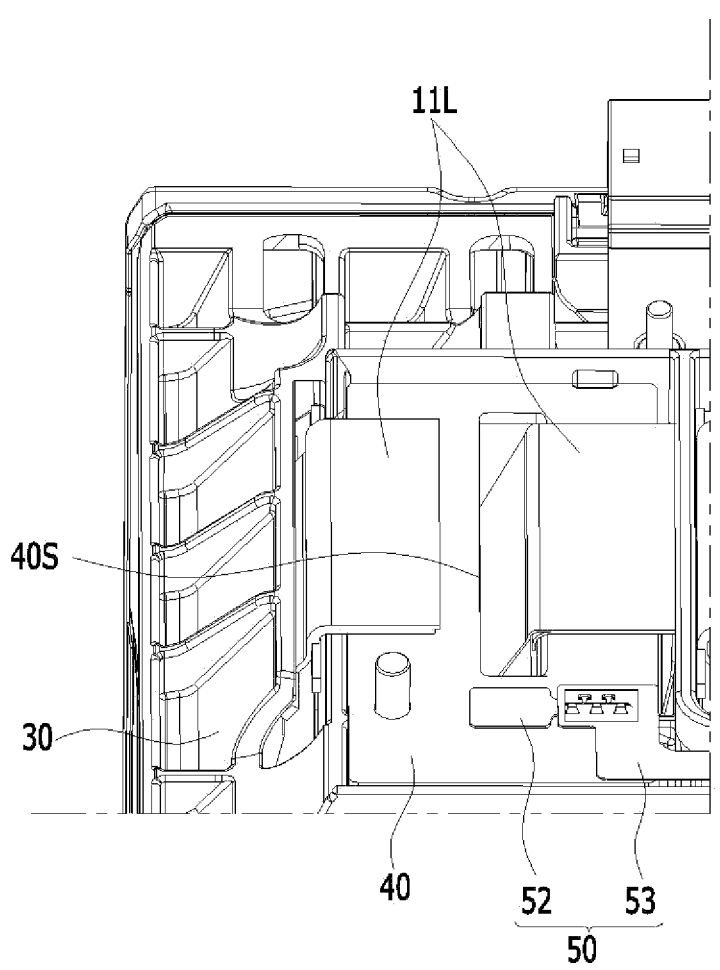

【FIG. 3】
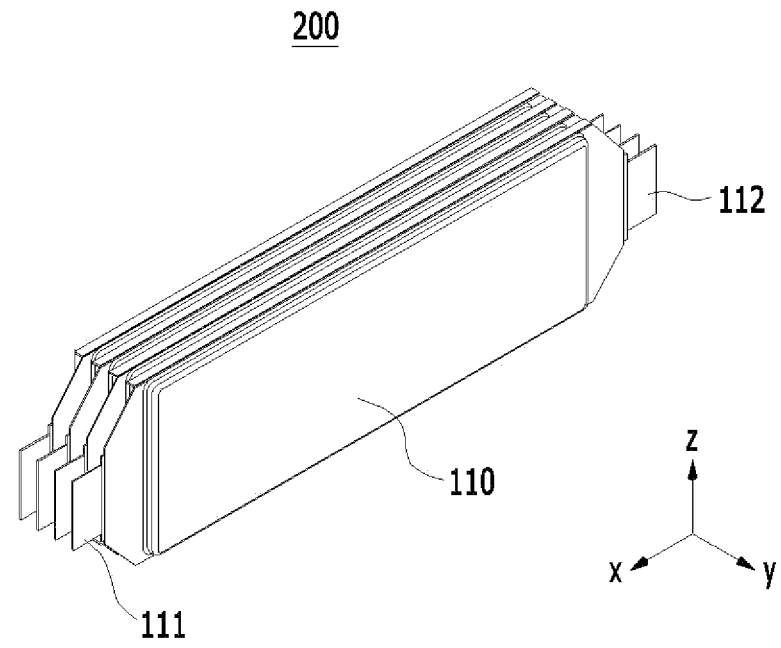

【FIG. 4】
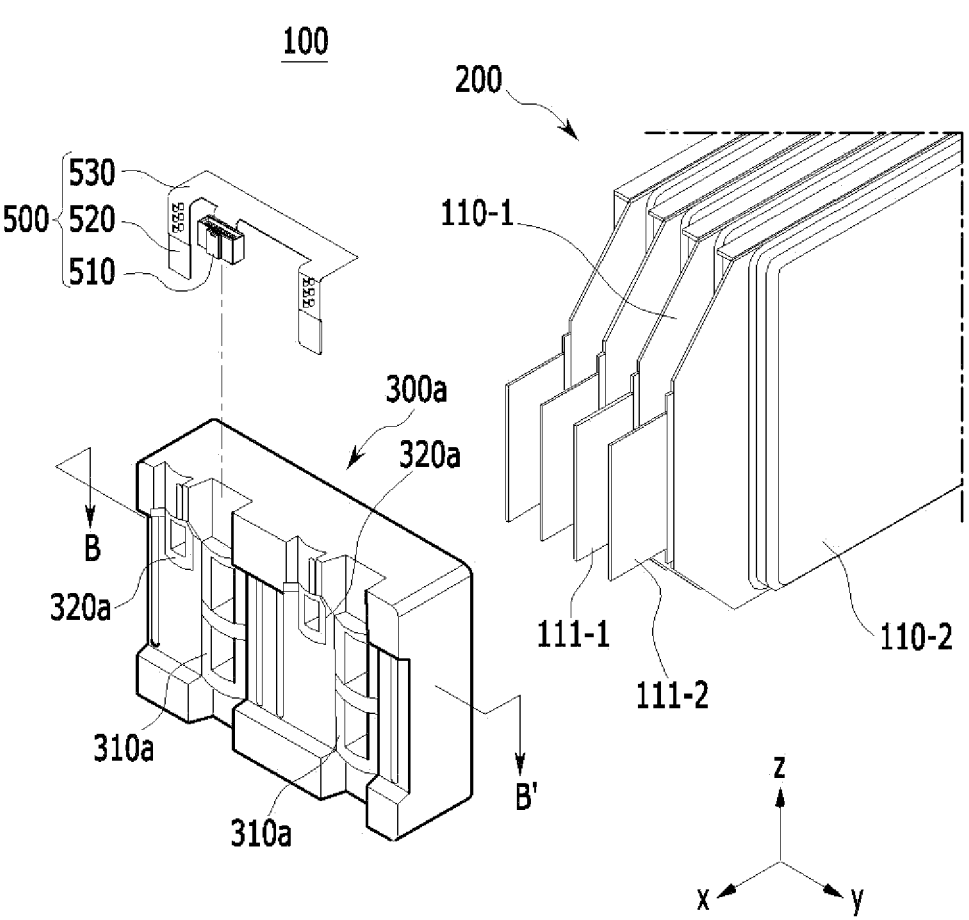

【FIG. 5】
300a
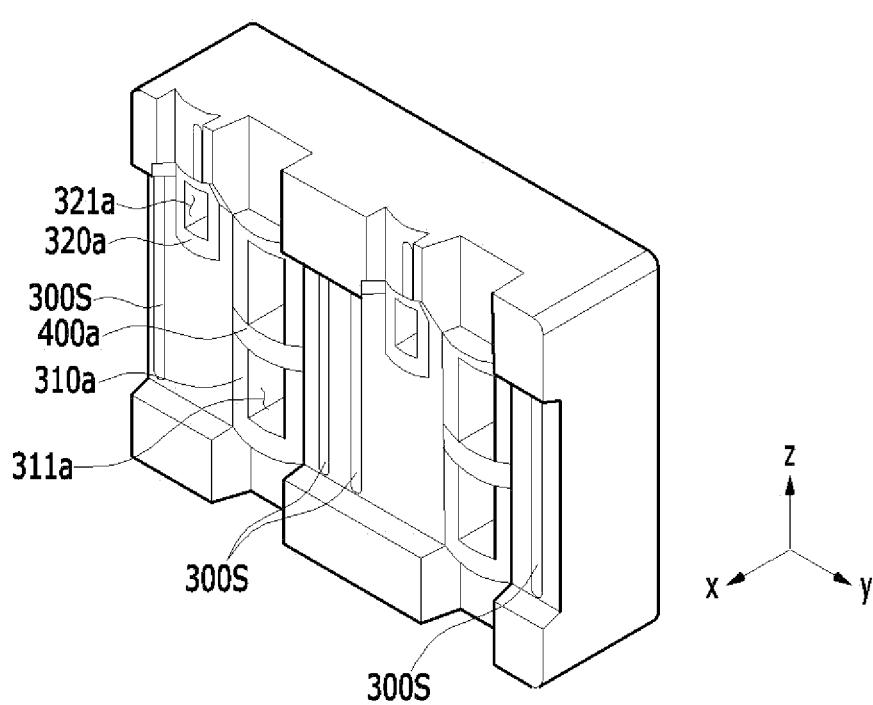

[FIG. 6]
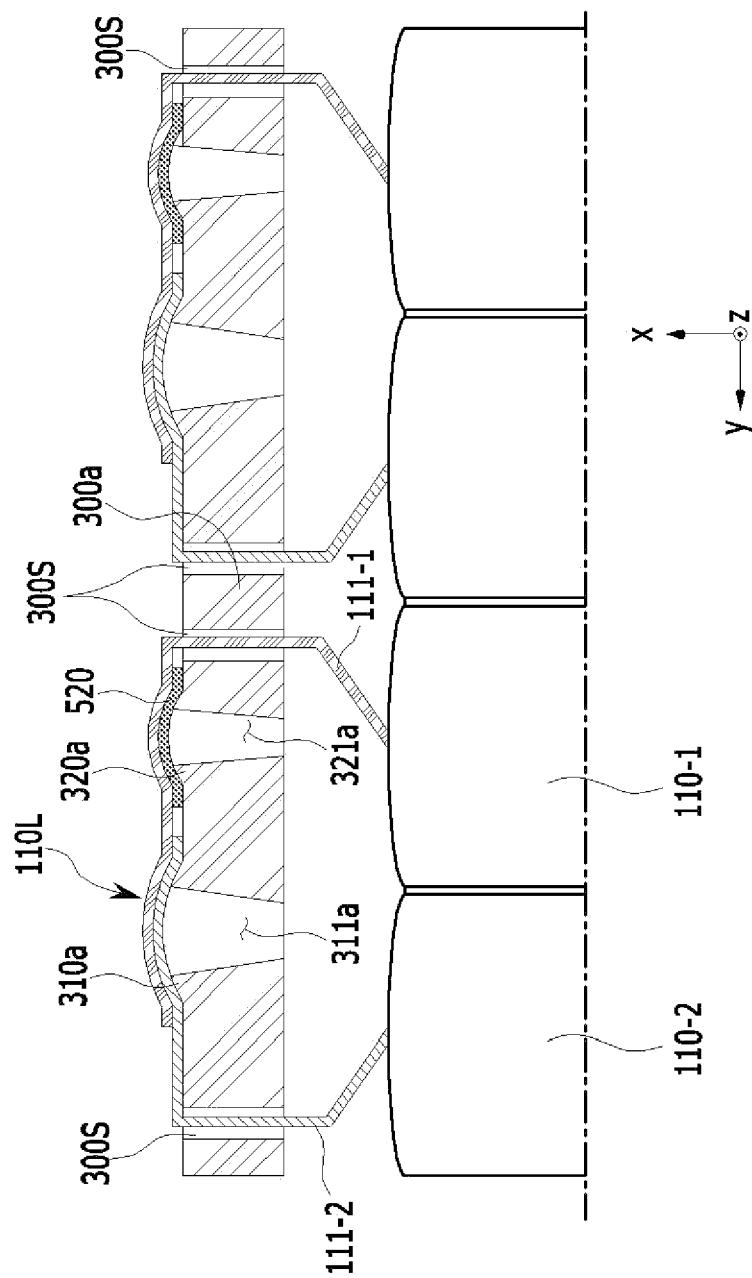

【FIG. 7】
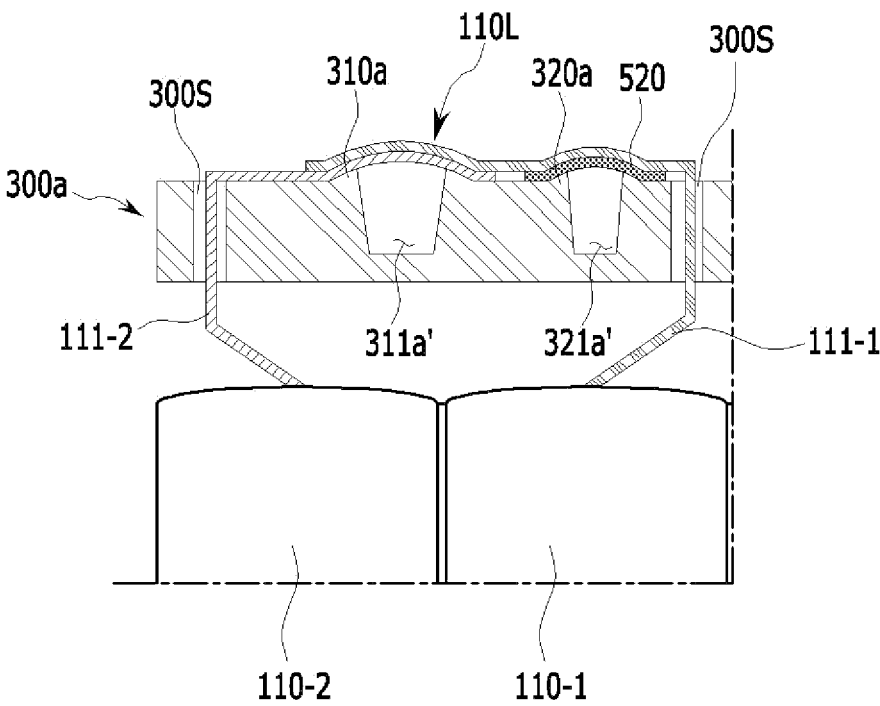

【FIG. 8】
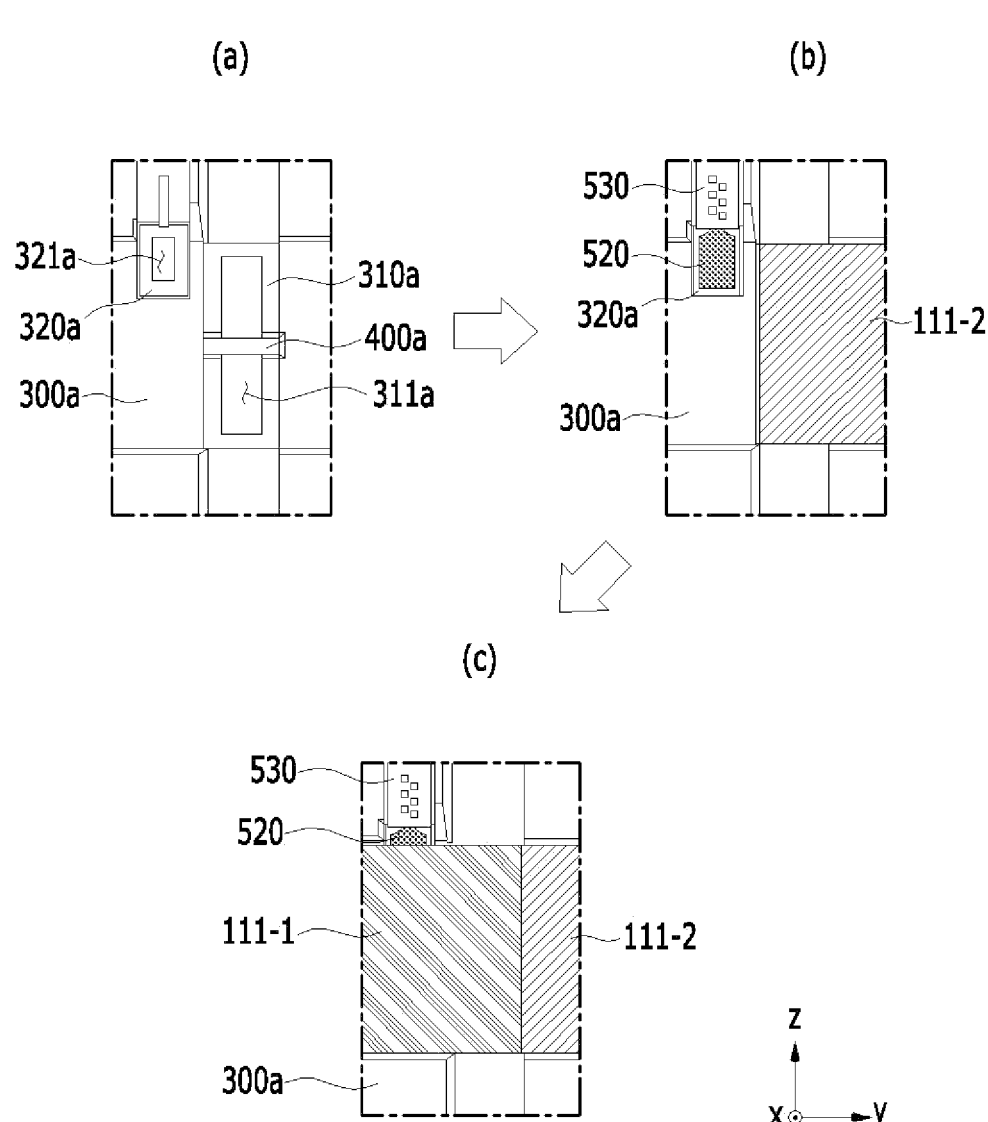

【FIG. 9】
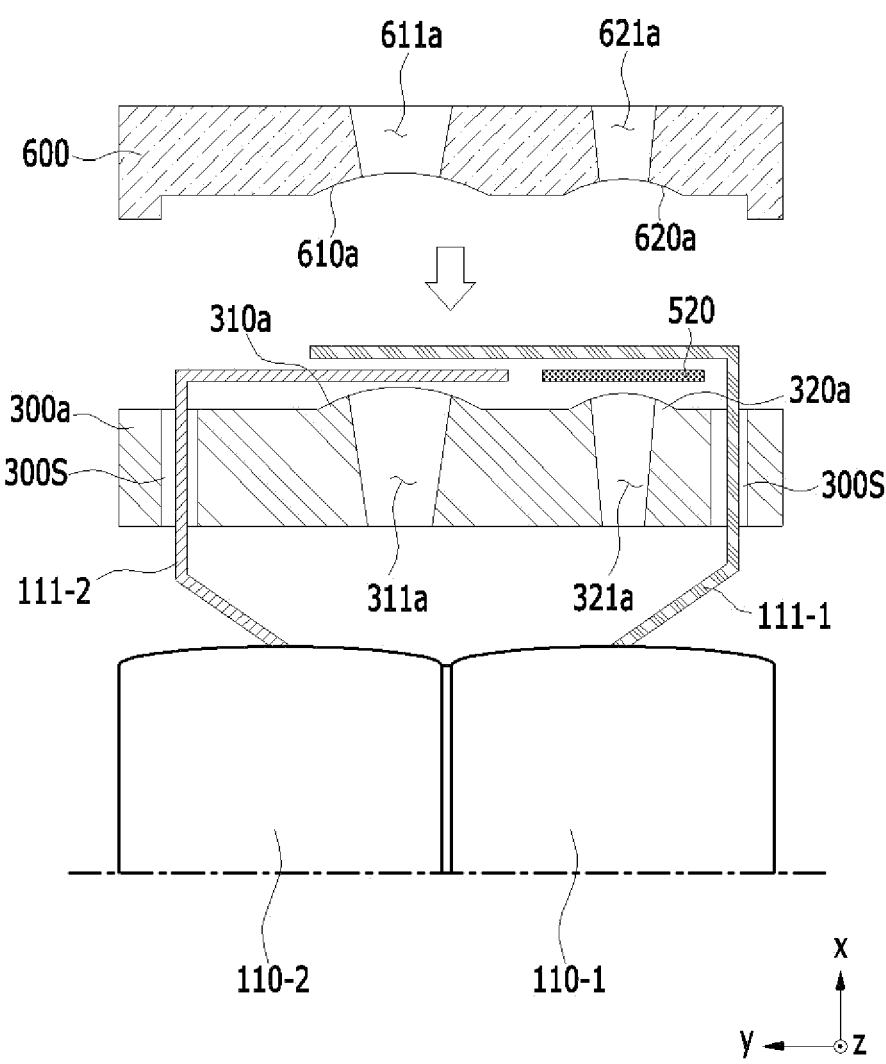

【FIG. 10】
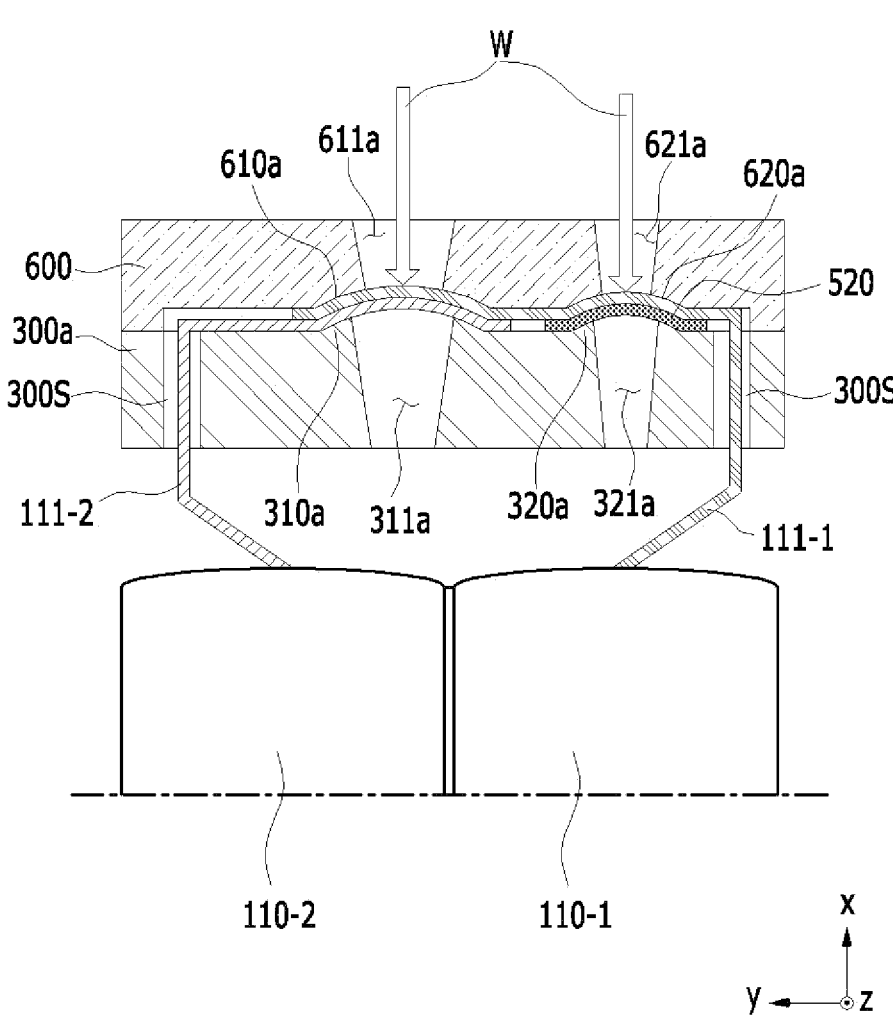

【FIG. 11】
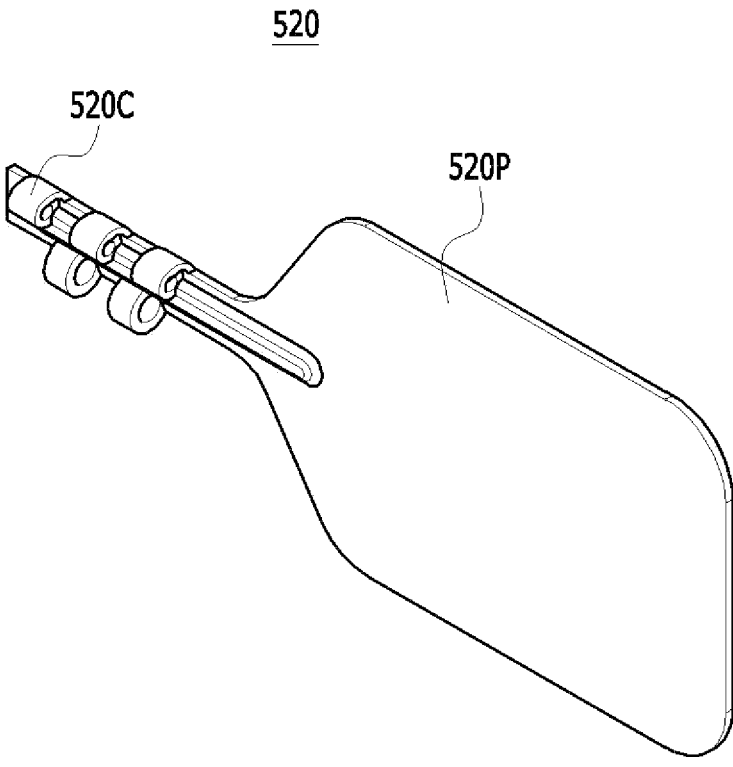

【FIG. 12】
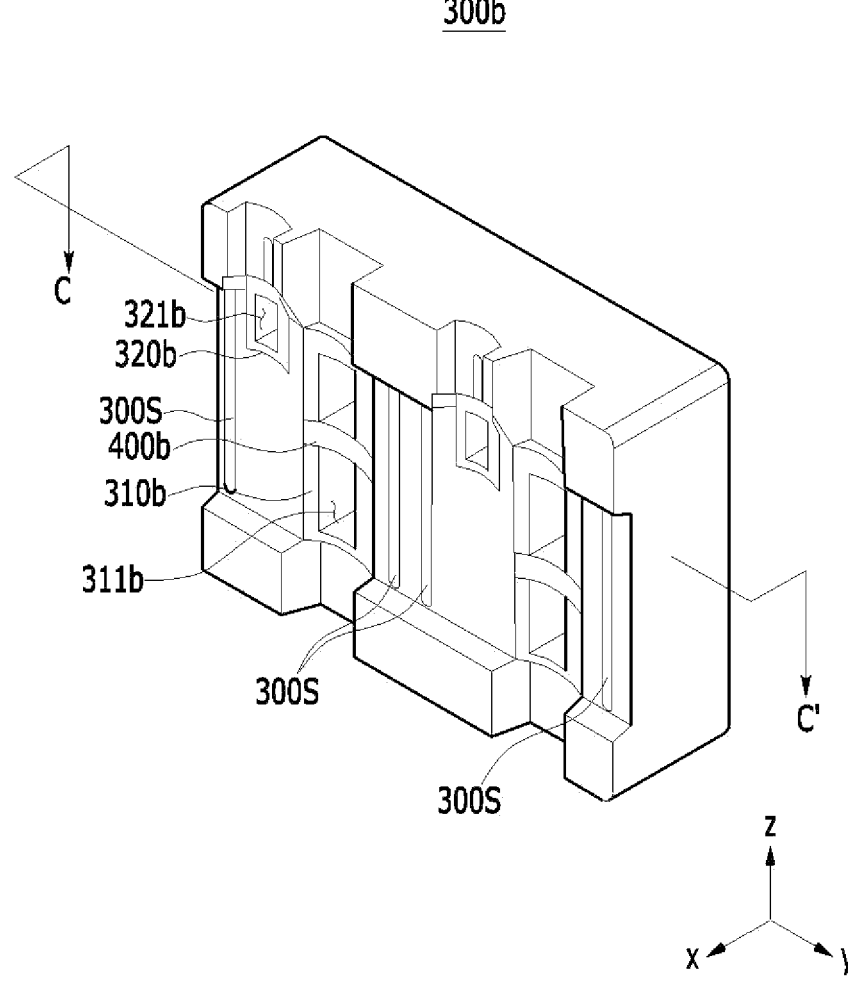

[FIG. 13]
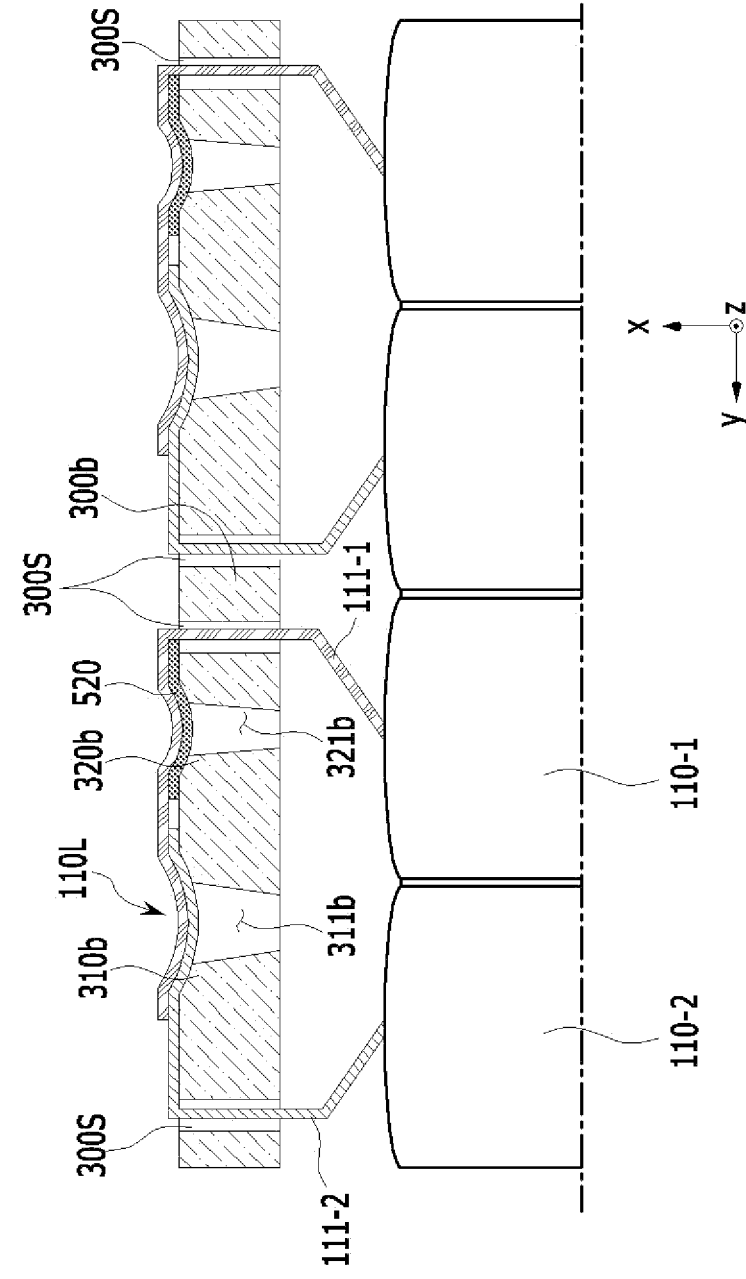

【FIG. 14】
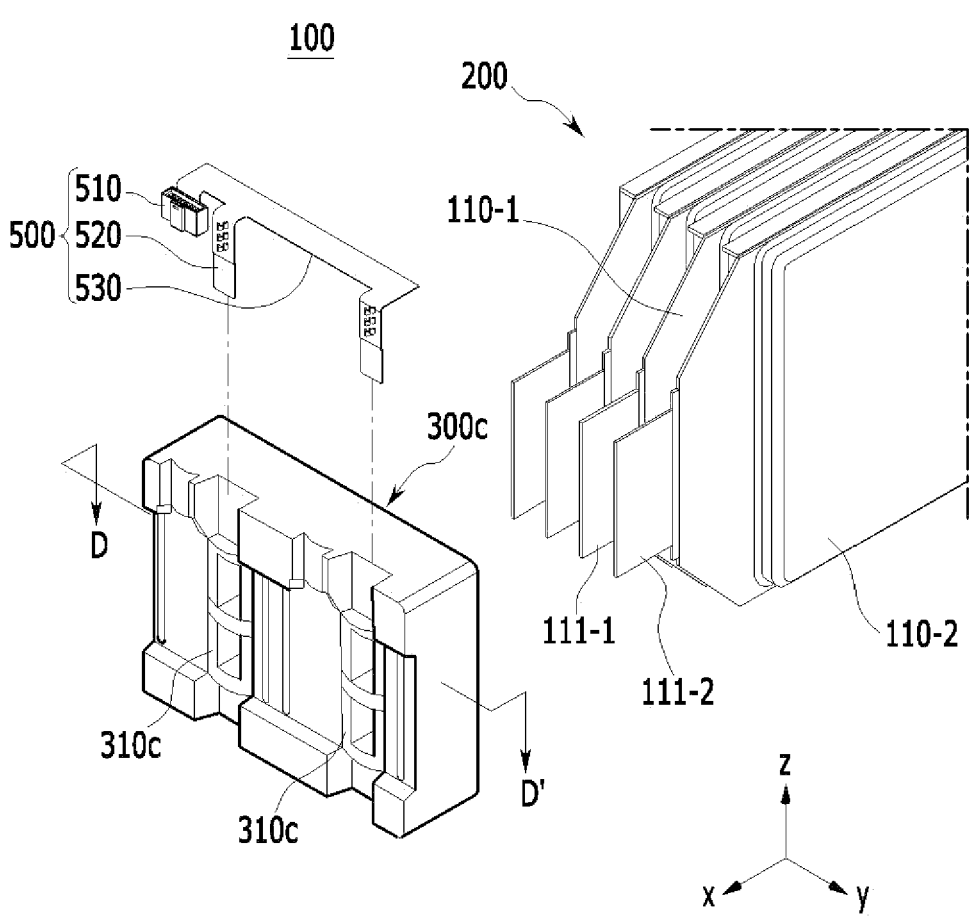

[FIG. 15]
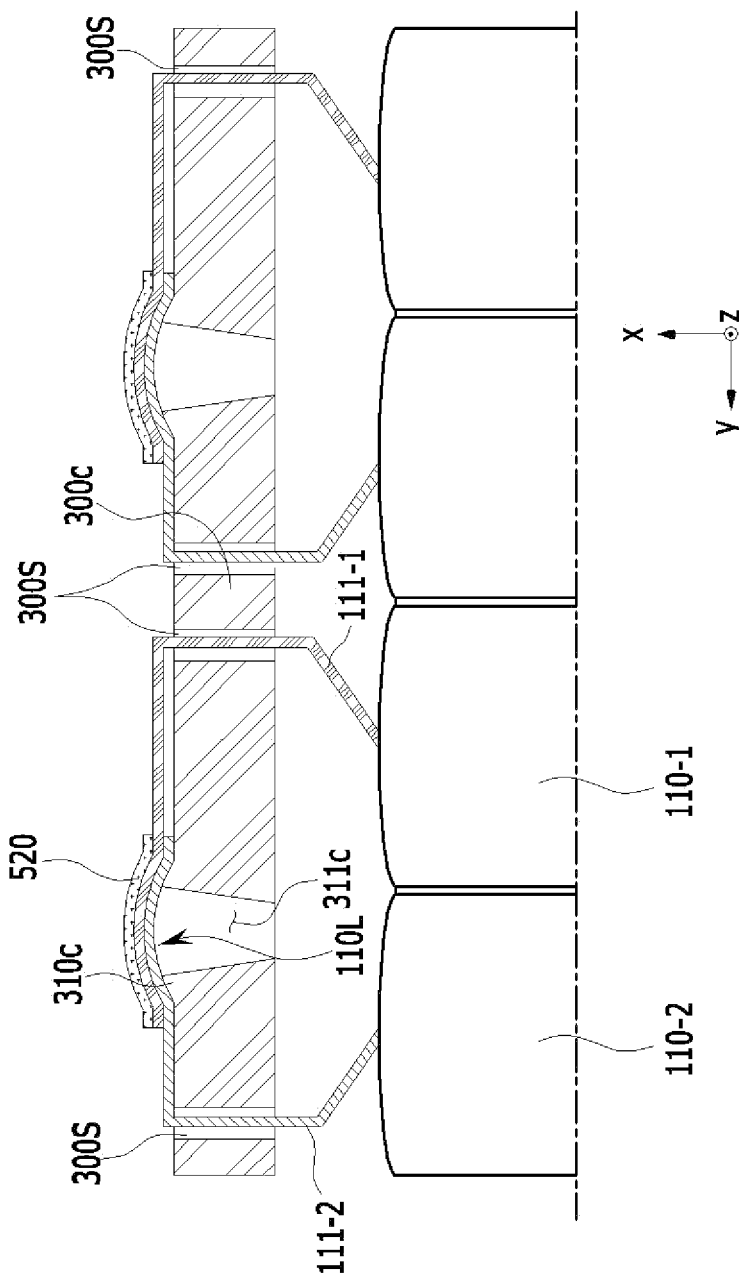

【FIG. 16】
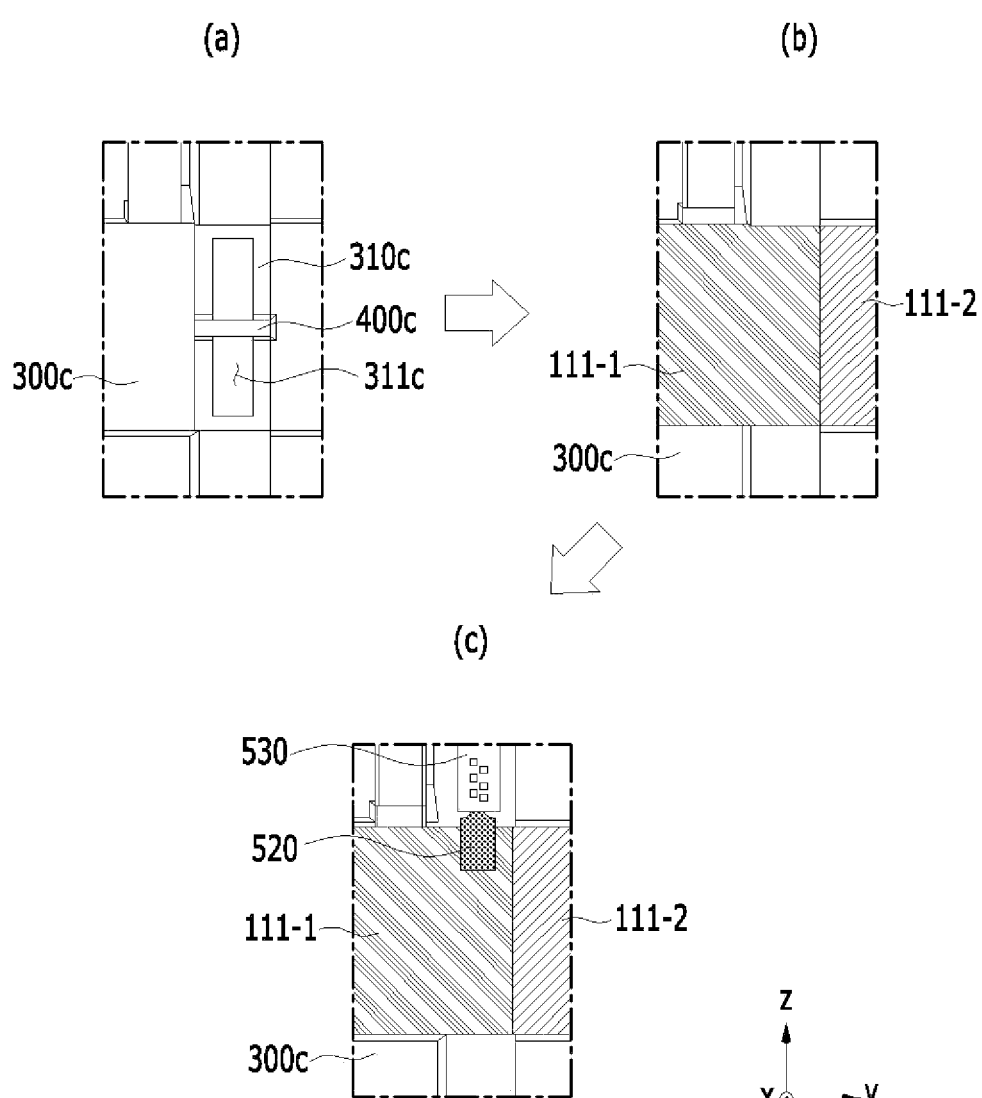

【FIG. 17】
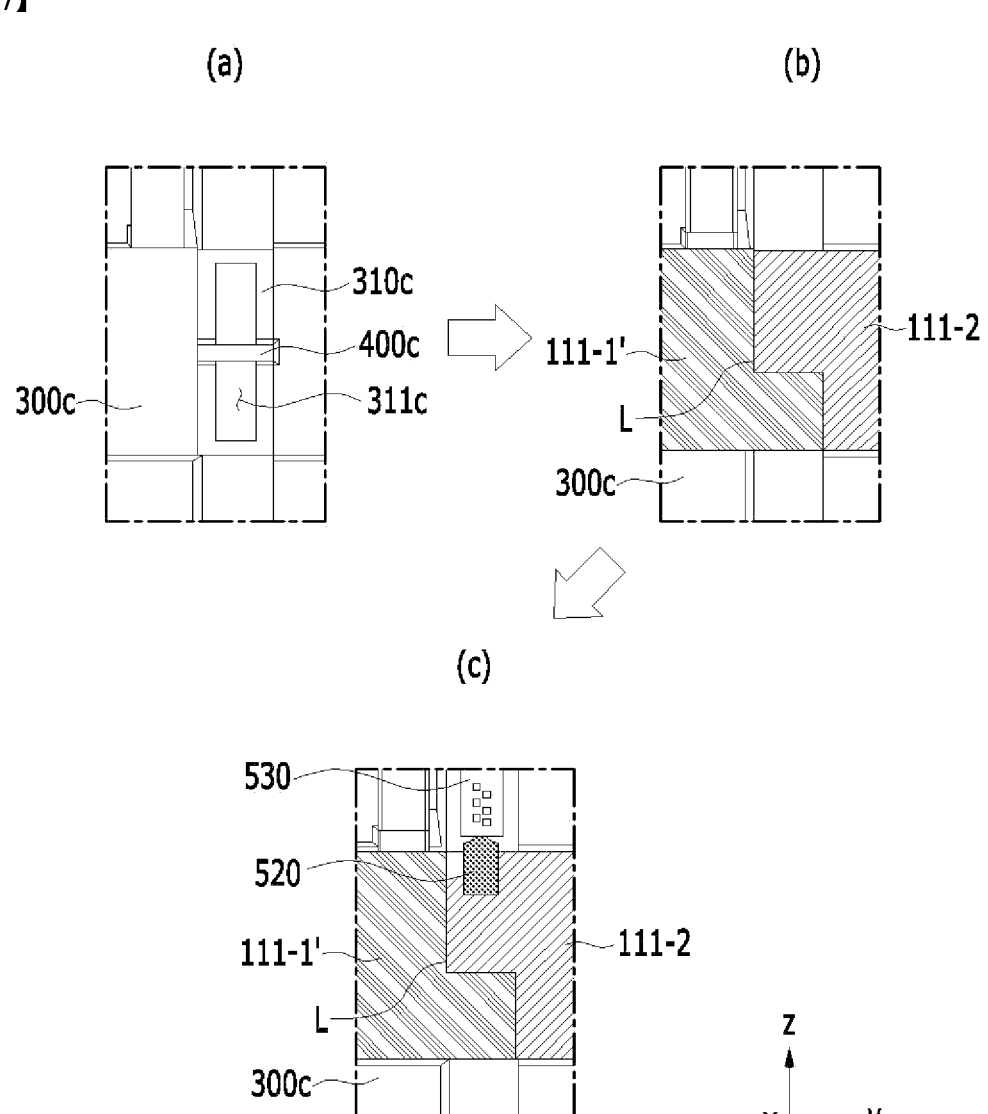

【FIG. 18】
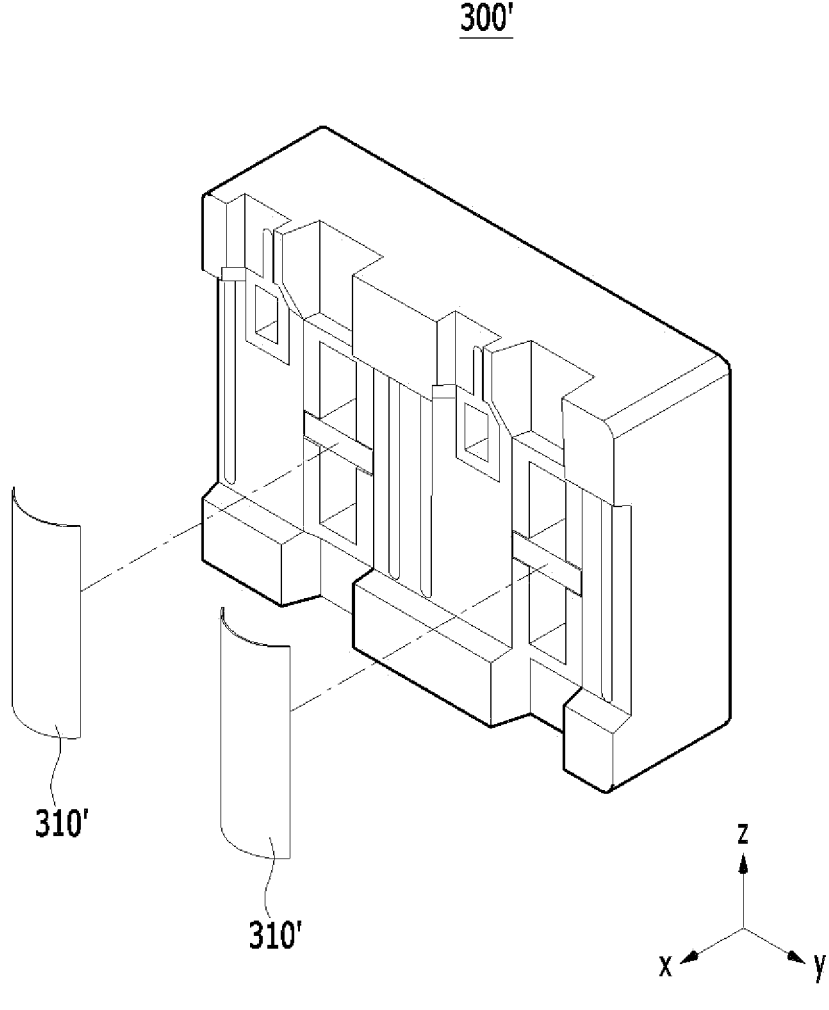

【FIG. 19】
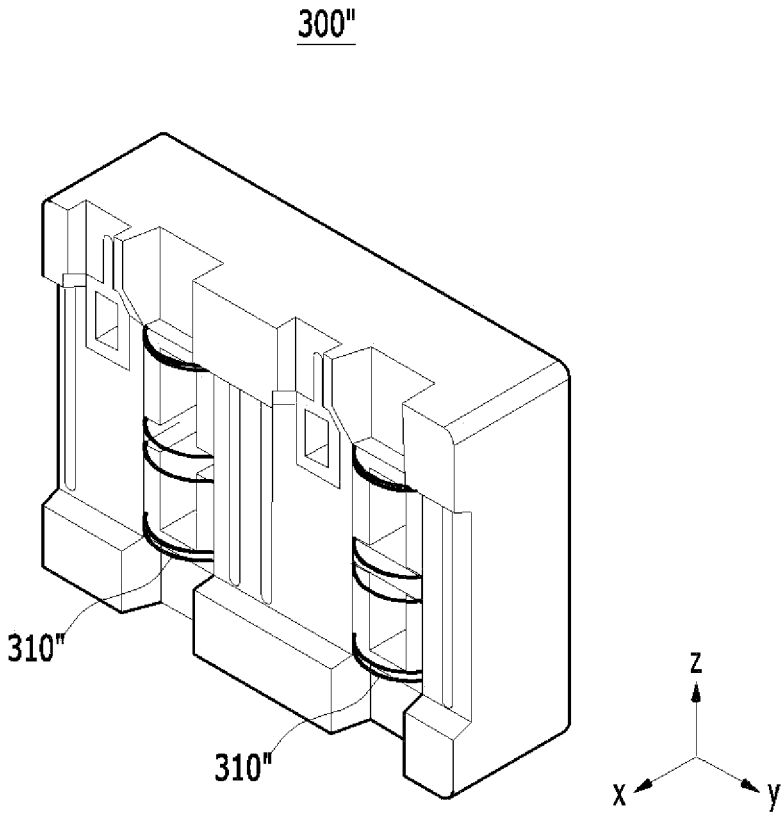

BATTERY MODULE AND MANUFACTURING METHOD OF THE SAME

CROSS CITATION WITH RELATED APPLICATION(S)

This application claims the benefit of Korean Patent Application No. 10-2021-0024301 filed on Feb. 23, 2021 and Korean Patent Application No. 10-2022-0023214 filed on Feb. 22, 2022 in the Korean Intellectual Property Office, the entire contents of which are incorporated herein by reference.

TECHNICAL FIELD

The present disclosure relates to a battery module and a manufacturing method of the same, and more particularly to a battery module having improved manufacturing process-ability and a manufacturing method of the same.

BACKGROUND

In modern society, as portable devices such as a mobile phone, a notebook computer, a camcorder and a digital camera has been daily used, the development of technologies in the fields related to mobile devices as described above has been activated. In addition, chargeable/discharge-able secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibit-ing memory effects in comparison with nickel-based sec-ondary batteries and thus being freely charged and dis-charged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate, each being coated with the cathode active material and the anode active material, are arranged with a separator being interposed therebetween, and a battery case which seals and houses the electrode assembly together with an electrolytic solution.

Generally, the lithium secondary battery may be classified based on the shape of the exterior material into a can-type secondary battery in which the electrode assembly is built in a metal can, and a pouch-type secondary battery in which the electrode assembly is built in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a BMS (battery management system) and a cooling system to form a battery pack.

Conventional battery modules can utilize a busbar and a busbar frame for connection between a plurality of battery cells. The structures of a busbar and a busbar frame used in conventional battery modules will be described below with reference to FIGS. 1 and 2.

FIG. 1 is a perspective view of a conventional battery module. FIG. 2 is a partial view which enlarges and shows a section "A" of FIG. 1. FIG. 1 shows a state in which the battery module is erected to show the appearance of the busbar frame and the busbar.

Referring to FIGS. 1 and 2, the conventional battery module 10 includes a battery cell stack 20 on which the battery cells 11 are stacked, and a busbar frame 30 disposed on both sides of the battery cell stack 20. A busbar 40 and a sensing assembly 50 can be mounted on the busbar frame 30.

The busbar 40 is for electrical connection between the plurality of battery cells 11, and the electrode lead 11L of the battery cell 11 is bent after passing through a slit formed in the busbar frame 30, and can be connected with the busbar 40. In some cases, the electrode lead 11L may also pass through a slit 40S formed in the busbar 40. In the connection between the electrode lead 11L and the busbar 40, the method is not limited as long as an electrical connection is possible, and as an example, connection may be performed by a weld junction. In this manner, the battery cell stack 20 to which the battery cells 11 are electrically connected via the busbar 40 can be connected to other battery modules, a BDU (Battery Disconnect Unit) or the like via a terminal busbar or the like exposed to the outside. That is, the conventional battery module 10 electrically connects the battery cells 11 via the busbar 40 and electrically connects the battery module 10 with other battery modules via a terminal busbar or the like, thereby capable of realizing HV (High Voltage) connection. Here, the HV connection is a connection that plays a role of a power source for supplying power, and means a connection between battery cells or a connection between battery modules.

Meanwhile, in order to prevent ignition or explosion of the battery module 10, it is necessary to measure the voltage information and temperature information of the battery cell 11 and transmit it to the BMS (Battery Management Sys-tem). The conventional battery module 10 includes a sensing assembly 50 and thus, can transmit voltage information of a battery cell to the BMS. Specifically, the sensing assembly 50 can be connected to the busbar 40 via a joining member 52 to measure the voltage of each battery cell, and the measured value can be transmitted to an external BMS via a connection member 53 and a connector (not shown). That is, the conventional battery module 10 can transmit voltage information via the busbar 40 and the sensing assembly 50, thereby realizing a low voltage (LV) connection. Here, the LV connection means a sensing connection for sensing and controlling the voltage of the battery cell.

Taken together, the conventional battery module 10 joins the electrode lead 11L of each stacked battery cell to the busbar 40 in order to realize HV connection, and the sensing assembly 50 can be connected to the busbar 40 to which the electrode lead 11L is joined in order to realize LV connec-tion. Further, the busbar frame 30 can be formed in order to mount such a busbar 40.

However, the battery module 10 requires many parts in order to realize such an HV connection and an LV connection, and has a drawback that a complicated series of manufacturing processes is required.

SUMMARY OF THE INVENTION

Technical Problem

The present disclosure has been designed to solve the above-mentioned problems, and an object of the present disclosure is to provide a battery module having improved manufacturing processability by improving the conventional HV connection structure and LV connection structure, and a manufacturing method of the same.

However, the problem to be solved by the embodiments of the present disclosure is not limited to the above-described problems, and can be variously expanded within the scope of the technical idea included in the present disclosure.

Technical Solution

A battery module according to an embodiment of the present disclosure includes a battery cell stack in which a plurality of battery cells are stacked; and a lead frame located on one side of the battery cell stack. A first electrode lead protruding from a first battery cell among the plurality of battery cells and a second electrode lead protruding from a second battery cell among the plurality of battery cells are bent after passing through a corresponding slit in the lead frame and then overlapped to form an electrode lead assembly. In the electrode lead assembly, at least a part of the first electrode lead and at least a part of the second electrode lead are joined to each other. The lead frame includes a first support part on which the electrode lead assembly is located, the first support part having a shape that is protruded in a direction in which the electrode lead assembly is located or a shape that is recessed in a direction opposite to the direction in which the electrode lead assembly is located. At least a part of the electrode lead assembly is in contact with one surface of the first support part.

The first support part may have an arch shape that is protruded in the direction in which the electrode lead assembly is located.

The first support part may have an arch shape that is recessed in the direction opposite to the direction in which the electrode lead assembly is located.

A first opening part may be located in a center of the first support part, and the first opening part may be open on a side where the electrode lead assembly is located.

The lead frame may include an auxiliary support part crossing the first opening part, and the auxiliary support part may have a protruded or recessed shape in correspondence to the shape of the first support part.

The first support part may be at least one of a metal plate or a spring member attached to the lead frame.

The battery module may further comprise a sensing assembly located on the lead frame. The sensing assembly may comprise a module connector; a joining plate joined to at least one of the first electrode lead or the second electrode lead; and a connection member connecting the module connector and the joining plate.

The lead frame may comprise a second support part on which the first electrode lead and the joining plate are located, and the second support part may have a shape that is protruded in a direction in which the joining plate is located or a shape that is recessed in a direction opposite to the direction in which the joining plate is located. At least a part of a portion in which the first electrode lead and the joining plate are overlapped may be in contact with one surface of the second support part.

In the second support part, the first electrode lead and the joining plate may be joined to each other.

The second support part may have an arch shape that is protruded in the direction in which the joining plate is located.

The second support part may have an arch shape that is recessed in the direction opposite to the direction in which the joining plate is located.

A second opening part may be located in a center of the second support part, and the second opening part may be open on a side where the joining plate is located.

The joining plate is located on the first support part and may be joined to the electrode lead assembly.

At least a part of the joining plate may be in contact with the electrode lead assembly.

On the first support part, the first electrode lead may be joined while covering the second electrode lead to form the electrode lead assembly, a recessed side may be located in the first electrode lead, and the joining plate may be joined to the second electrode lead by the recessed side.

A method of manufacturing a battery module according to another embodiment of the present disclosure comprises a step of stacking a plurality of battery cells to form a battery cell stack; a step of disposing a lead frame on one side of the battery cell stack; and a joining step in which a first electrode lead protruding from a first battery cell among the plurality of battery cells and a second electrode lead protruding from a second battery cell among the plurality of battery cells are bent after passing through a corresponding slit in the lead frame, then overlapped, and at least partially joined to each other to form an electrode lead assembly. The lead frame comprises a first support part on which the electrode lead assembly is located, the first support part having a shape that is protruded in a direction in which the electrode lead assembly is located or a shape that is recessed in a direction opposite to the direction in which the electrode lead assembly is located. In the joining step, the first electrode lead and the second electrode lead are overlapped and joined while being in contact with the first support part to form the electrode lead assembly.

The first support part may have an arch shape that is protruded in the direction in which the first electrode lead and the second electrode lead are located, or may have an arch shape that is recessed in the direction opposite to the direction in which the first electrode lead and the second electrode lead are located.

In the joining step, a welding jig may be disposed so as to cover a part of the first electrode lead and a part of the second electrode lead, and, between the lead frame and the welding jig, the first electrode lead and the second electrode lead may be joined while being in contact with each other.

A first jig opening part may be located in the welding jig. A welding device may join a part where the first electrode lead and the second electrode lead are exposed through the first jig opening part to form the electrode lead assembly.

A first opening part may be located in a center of the first support part, the first opening part may be open on a side where the electrode lead assembly is located. In the joining step, a portion corresponding to a region in which the first opening part may be located among the first electrode lead and the second electrode lead may be weld-joined to each other to form the electrode lead assembly.

Advantageous Effects

According to embodiments of the present disclosure, in realizing the HV connection, junction between the electrode leads is performed on the support part having a protruded or recessed structure. Thereby, the electrode leads can be brought into close contact with each other, thus facilitating their joining.

In addition, since the busbar is eliminated, the space utilization rate of the battery module can be increased, and an effect of cost reduction can be obtained.

Further, instead of eliminating the conventional busbar, junction between the electrode leads and junction between the electrode leads and the sensing assembly are integrally formed to achieve HV connection and LV connection at the same time, and therefore, productivity improvement can be expected.

The effects of the present disclosure are not limited to the effects mentioned above and additional other effects not mentioned above will be clearly understood from the description of the appended claims by those skilled in the art.

BRIEF DESCRIPTION OF THE DRAWINGS

FIG. 1 is a perspective view of a conventional battery module;

FIG. 2 is a partial view which enlarges and shows a section "A" of FIG. 1;

FIG. 3 is a perspective view illustrating a battery cell stack according to an embodiment of the present disclosure;

FIG. 4 is an exploded perspective view illustrating a battery module according to an embodiment of the present disclosure;

FIG. 5 is a perspective view illustrating a lead frame included in the battery module of FIG. 4;

FIG. 6 is a cross-sectional view illustrating a cross section taken along the cutting line B-B' of FIG. 4;

FIG. 7 is a cross-sectional view which explains an opening part according to another embodiment of the present disclosure;

FIG. 8 is a plan view which explains the step of forming an electrode lead assembly;

FIGS. 9 and 10 are cross-sectional views which explain a manufacturing process of the electrode lead assembly;

FIG. 11 is a perspective view illustrating a joining plate according to an embodiment of the present disclosure;

FIG. 12 is a perspective view illustrating a lead frame according to another embodiment of the present disclosure;

FIG. 13 is a cross-sectional view illustrating a cross section taken along the cutting line C-C' of FIG. 12;

FIG. 14 is an exploded perspective view illustrating a battery module according to a modified embodiment of the present disclosure;

FIG. 15 is a cross-sectional view illustrating a cross section taken along the cutting line D-D' of FIG. 14;

FIG. 16 is a plan view which explains a manufacturing process of an electrode lead assembly according to a modified embodiment of the present disclosure;

FIG. 17 is a plan view which explains a manufacturing process of an electrode lead assembly according to another embodiment of the present disclosure;

FIG. 18 is a perspective view illustrating a lead frame according to another embodiment of the present disclosure; and FIG. 19 is a perspective view illustrating a lead frame according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a part is referred to as "including" or "comprising" a certain component, it means that the part can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 3 is a perspective view illustrating a battery cell stack according to an embodiment of the present disclosure. FIG. 4 is an exploded perspective view illustrating a battery module according to an embodiment of the present disclosure.

Referring to FIGS. 3 and 4, a battery module 100 according to an embodiment of the present disclosure includes a battery cell stack 200 in which a plurality of battery cells 110 including electrode leads 111 and 112 are stacked; and a lead frame 300a located on one side of the battery cell stack 200. Although not illustrated, a lead frame may be further located on the other side of the battery cell stack 200. However, in order to avoid repetition of the description, one lead frame 300a will be mainly described. The lead frame 300a preferably includes an electrically insulating material, and may include a plastic material as an example.

First, the battery cell 110 is preferably a pouch-type battery cell, and may be formed in a rectangular sheet-like structure. The electrode lead of the battery cell 110 according to the present embodiment includes two protruding electrode leads 111 and 112. Specifically, the battery cell 110 according to the present embodiment may have a structure in which two electrode leads 111 and 112 are protruded to face each other. More specifically, the two electrode leads 111 and 112 are connected to an electrode assembly (not shown) and protrude from the electrode assembly (not shown) to the outside of the battery cell 110. The two electrode leads 111 and 112 have different polarities from each other, where as an example, one of them may be a cathode lead 111, and the other may be an anode lead 112.

That is, the cathode lead 111 and the anode lead 112 may be protruded in mutually opposite directions with respect to one battery cell 110.

Meanwhile, the battery cell 110 can be produced by sealing the outer peripheral part of the cell case in a state in which an electrode assembly (not shown) is housed in a cell case. The cell case may be composed of a laminated sheet including a resin layer and a metal layer. That is, the battery cell 110 according to the present embodiment may be a pouch-type battery cell.

Such a battery cell 110 may be formed in plural numbers, and the plurality of battery cells 110 can be stacked so as to be electrically connected to each other, thereby forming a battery cell stack 200. Particularly, as shown in FIGS. 3 and 4, the plurality of battery cells 110 can be stacked along the y-axis direction. Thereby, the two electrode leads 111 and 112 may be protruded in the x-axis direction and the −x-axis direction, respectively. The battery cell stack 200 in which four battery cells 110 are stacked is shown as an exemplary structure in FIGS. 3 and 4, but the number of battery cells 110 is not particularly limited.

Meanwhile, the lead frame 300a according to the present embodiment is located on one side of the battery cell stack 200, and more specifically, may be located on one side of the battery cell stack 200 in a direction in which any one of the two electrode leads 111 and 112 protrude.

Next, the structure of the lead frame according to the present embodiment and the structure of the electrode lead assembly formed on the lead frame will be described in detail with reference to FIGS. 4 to 6.

FIG. 5 is a perspective view illustrating a lead frame included in the battery module of FIG. 4. FIG. 6 is a cross-sectional view illustrating a cross section taken along the cutting line B-B' of FIG. 4. At this time, FIG. 6 illustrates on the assumption that the electrode leads 111-1 and 111-2 of the battery cells 110-1 and 110-2 have passed through a slit 300S of the lead frame 300a for convenience of explanation.

Referring to FIGS. 4 to 6, two adjacent battery cells 110 among the plurality of battery cells 110 are designated and explained as a first battery cell 110-1 and a second battery cell 110-2, respectively. Although the first battery cell 110-1 and the second battery cell 110-2 will be mainly described, the same or similar structures can be applied to other battery cells.

A first electrode lead 111-1 protruding from the first battery cell 110-1 among the plurality of battery cells 110 and a second electrode lead 111-2 protruding from the second battery cell 110-2 among the plurality of battery cells 110 are bent after passing through slits 300S formed in the lead frame 300a and then overlapped to form an electrode lead assembly 110L. The electrode lead assembly 110L as used herein refers to a region where the first electrode lead 111-1 and the second electrode lead 111-2 overlap. In the electrode lead assembly 110L, at least a part of the first electrode lead 111-1 and at least a part of the second electrode lead 111-2 are joined to each other.

Meanwhile, the slits 300S may be formed in plural numbers so as to correspond to each of the electrode leads 111-1 and 111-2. By manufacturing as described above, the electrode lead assembly 110L may be located on a surface opposite to the surface facing the battery cell stack 200 among the surfaces of the lead frame 300a.

More specifically, the electrode leads 111-1 and 111-2 protruding in the same direction with respect to the adjacent battery cells 110-1 and 110-2 pass through the slits 300S, and then can be bent in a direction perpendicular to the protruding direction of the electrode leads 111-1 and 111-2 and overlapped to form the electrode lead assembly 110L. In the electrode lead assembly 110L, at least a part of the first electrode lead 111-1 and at least a part of the second electrode lead 111-2 can be joined to each other. That is, only a part of the overlapping portions of the first electrode lead 111-1 and the second electrode lead 111-2 can be joined, and the entire overlapping portion of the first electrode lead 111-1 and the second electrode lead 111-2 can be joined. The joining method is not particularly limited, but weld junction is preferably performed.

Unlike the conventional battery module 10 (see FIGS. 1 and 2) in which the electrode leads are connected to each other through the busbar 40, the electrode leads 111-1 and 111-2 according to the present embodiment can be directly joined to each other, thereby forming a high voltage (HV) connection. Here, the HV connection is a connection that serves as a power source for supplying power, and means a connection between battery cells or a connection between battery modules. Therefore, in the HV connection structure according to the present embodiment, the conventional busbar can be eliminated.

Meanwhile, the lead frame 300a includes a first support part 310a on which the electrode lead assembly 110L is located. The first support part 310a may have a shape that is protruded in a direction in which the electrode lead assembly 110L is located, or a shape that is recessed in a direction opposite to the direction in which the electrode lead assembly 110L is located. As an example, FIG. 6 illustrates the first support part 310a having a shape protruding in the direction in which the electrode lead assembly 110L is located.

On the first support part 310a of the lead frame 300a, the first electrode lead 111-1 and the second electrode lead 111-2 are overlapped and joined to form an electrode lead assembly 110L, wherein at least a part of the electrode lead assembly 110L is in close contact with one surface of the first support part 310a. Specifically, a part of the electrode lead assembly 110L may have a shape corresponding to the shape of the first support part 310a on the first support part 310a. More specifically, a part of the electrode lead assembly 110L according to the present embodiment may be bent so as to correspond to the first support part 310a having a shape that is protruded in the direction in which the electrode lead assembly 110L is located.

More specifically, the first support part 310a may have an arch shape that is protruded in a direction in which the electrode lead assembly 110L is located. That is, the first support part 310a may have a structure that convexly protrudes into an arch shape. Thereby, at least a part of the electrode lead assembly 110L may be bent into an arch shape. As the first support part 310a convexly protrudes, the first electrode lead 111-1 and the second electrode lead 111-2 can be brought into close contact with each other when they are joined. Thereby, junction between electrode leads becomes easier, and a configuration similar to that of a conventional busbar is unnecessary. As described above, since the battery module 100 according to the present embodiment eliminates the conventional busbar, the space utilization rate of the battery module 100 can be increased, and the effect of cost reduction can be obtained. The joining process between the first electrode lead 111-1 and the second electrode lead 111-2 will be described in detail later with reference to FIGS. 8 to 10.

Meanwhile, a pierced first opening part 311a may be formed in the center of the first support part 310a. The first opening part 311a according to the present embodiment may have a shape in which both the side where the electrode lead assembly 110L is located and the side where the battery cells 110-1 and 110-2 are located are pierced. The weld junction can be used in the joining process between the first electrode lead 111-1 and the second electrode lead 111-2. Considering the material of the lead frame 300a, damage to the lead frame 300a may occur due to the weld junction. In order to prevent the first support part 310a of the lead frame 300a from being damaged due to the weld junction, a pierced first opening part 311a may be provided in the center of the first support 310a. Due to the first opening part 311a, the first support part 310a does not come into contact with a portion where the first electrode lead 111-1 and the second electrode lead 111-2 are welded. The area of the first opening part 311a is not particularly limited, but it is preferable to form into the area that can cover both the portions where the first electrode lead 111-1 and the second electrode lead 111-2 are joined.

Further, the lead frame 300a according to the present embodiment may include an auxiliary support part 400a crossing the first opening part 311a, and the auxiliary support 400a may be protruded in correspondence to the shape of the first support part 310a. More specifically, the auxiliary support part 400a may be convexly protruded into an arch shape in correspondence to the shape of the first support part 310a. The space formed by the first opening part 311a may be divided into two by the auxiliary support part 400a. If the area of the first opening part 311a is formed slightly large, the first electrode lead 111-1 and the second electrode lead 111-2 can be joined to each other while being not in close contact with the first support part 310a that protrudes convexly. Thereby, by configuring the auxiliary support part 400a crossing the first opening part 311a so as to support the first electrode lead 111-1 and the second electrode lead 111-2, junction between the first electrode lead 111-1 and the second electrode lead 111-2 can be stably performed.

FIG. 7 is a cross-sectional view which explains an opening part according to another embodiment of the present disclosure.

Referring to FIG. 7, a pierced first opening part 311a' may be formed in the center of the first support part 310a. However, unlike the first opening part 311a shown in FIG. 6, the first opening 311a' according to the present embodiment is configured such that only the side where the electrode lead assembly 110L is located is pierced, and the side where the battery cells 110-1 and 110-2 are located may be a closed form. Due to such a first opening part 311a', the portion where the first electrode lead 111-1 and the second electrode lead 111-2 are welded and the first support part 310a do not contact each other. That is, it is possible to prevent the first support part 310a from being damaged during the welding process. In addition, since the side where the battery cells 110-1 and 110-2 are located is closed without being opened, the battery cells 110-1 and 110-2 are not exposed. Laser welding may be used for the welding, but such closed portion prevents the laser beam from reaching the battery cells 110-1 and 110-2. That is, according to the present embodiment, the first support part 310a having the first opening part 311a' in the form of piercing only one side can prevent the first support part 310a from being directly damaged during the welding process and at the same time, can protect the battery cells 110-1 and 110-2.

Meanwhile, referring to FIGS. 4 to 6 again, the battery module 100 according to the present embodiment may further include a sensing assembly 500 mounted on the lead frame 300a. The sensing assembly 500 may include a module connector 510, a joining plate 520, and a connection member 530. The sensing assembly 500 may be located on a surface opposite to the surface facing the battery cell stack 200 among the surfaces of the lead frame 300a.

The sensing assembly 500 is for a low voltage (LV) connection, wherein the LV connection means a sensing connection for sensing and controlling the voltage of a battery cell. The voltage information and temperature information of the battery cell 110 can be measured through the sensing assembly 500 and transmitted to an external BMS (Battery Management System). The sensing assembly 500 may be connected to the first electrode lead 111-1.

Specifically, the module connector 510 may be mounted on the lead frame 300a and configured to transmit and receive signals to and from an external control device to control the plurality of battery cells 110.

The joining plate 520 may include a metal material having battery conductivity, and may be joined to at least one of the first electrode lead 111-1 and the second electrode lead 111-2.

The connection member 530 is a member for connecting the module connector 510 and the joining plate 520, and may be a flexible printed circuit board (FPCB) or a flexible flat cable (FFC).

Voltage and temperature information measured from the plurality of battery cells 110 pass through the joining member 520, the connection member 530, and the module connector 510 in sequence, and can be transmitted to an external BMS (Battery Management System). That is, the sensing assembly 500 may detect and control phenomena such as overvoltage, overcurrent, and overheating of each battery cell 110.

At this time, the lead frame 300a according to the present embodiment may include a second support part 320a in which the first electrode lead 111-1 and the joining plate 520 are located. The second support part 320a may have a shape that is protruded in a direction in which the joining plate 520 is located or a shape that is recessed in a direction opposite to the direction in which the joining plate 520 is located. As an example, FIG. 6 illustrates the second support part 320a that is protruded in the direction in which the joining plate 520 is located.

In the second support part 320a, the first electrode lead 111-1 and the joining plate 520 can be overlapped and partially joined to each other, and at least a part of the overlapping portion of the first electrode lead 111-1 and the joining plate 520 may be in close contact with one surface of the second support part 320a. Specifically, a part of the joining plate 520 may have a shape corresponding to the shape of the second support part 320a on the second support part 320a. More specifically, the portion where the first electrode lead 111-1 and the joining plate 520 are joined may be bent so as to correspond to the second support part 320a protruding in the direction in which the joining plate 520 is located.

More specifically, the second support part 320a may have an arch shape that is protruded in a direction in which the joining plate 520 is located. That is, the second support part 320a may have a structure that convexly protrudes into an arch shape. Thereby, at least a part of a portion where the first electrode lead 111-1 and the joining plate 520 are joined may also be bent into an arch shape. As the second support part 320a protrudes convexly, the first electrode lead 111-1 and the joining plate 520 can be brought into close contact with each other when they are joined. Thereby, junction becomes easier, and ultimately, a configuration similar to a conventional busbar is unnecessary. The joining process between the first electrode lead 111-1 and the joining plate 520 will be described in detail later with reference to FIGS. 8 to 10.

Meanwhile, a pierced second opening part 321a may be formed in the center of the second support part 320a. The second opening part 321a according to the present embodiment may have a shape in which both the side where the joining plate 520 is located and the side where the battery cells 110-1 and 110-2 are located are pierced. Weld junction can be used in the joining process between the first electrode lead 111-1 and the joining plate 520, but considering the material of the lead frame 300a, damage to the lead frame 300a may occur due to the weld junction. In order to prevent the second support part 320a of the lead frame 300a from being damaged by the weld junction, a pierced second opening part 321a may be provided in the center of the second support part 320a. Due to the second opening part 321a, the second support part 320a does not come into contact with a portion where the first electrode lead 111-1 and the joining plate 520 are welded. The area of the second opening part 321a is not particularly limited, but it is preferable to form into the area that can cover all the portions where the first electrode lead 111-1 and the joining plate 520 are joined.

Referring to FIG. 7, the second opening part 321a' according to another embodiment of the present disclosure is configured such that only the side where the joining plate 520 is located is pierced, and the side where the battery cells 110-1 and 110-2 are located may be a closed form, unlike the second opening part 321a shown in FIG. 6. A portion where the first electrode lead 111-1 and the joining plate 520 are welded by the second opening part 321a' does not come into contact with the second support part 320a. That is, it is possible to prevent the second support part 320a from being damaged during the welding process. In addition, since the side where the battery cells 110-1 and 110-2 are located is closed without being opened, the battery cells 110-1 and 110-2 are not exposed. Laser welding may be used for the welding, and this closed portion prevents the laser beam from reaching the battery cells 110-1 and 110-2. That is, according to the present embodiment, the second support part 320a having the second opening part 321a' in the form of piercing only one side can prevent the second support part 320a from being directly damaged during the welding process and at the same time, protect the battery cells 110-1 and 110-2.

Next, a method of manufacturing a battery module according to an embodiment of the present invention will be described in detail with reference to FIGS. 8 to 10 together with FIGS. 4 and 6.

FIG. 8 is a plan view which explains a step of forming an electrode lead assembly. Specifically, FIG. 8(*a*) to FIG. 8(*c*) show a state in which the lead frame 300a of FIG. 4 is viewed along the −x axis on the yz plane.

FIGS. 9 and 10 are cross-sectional views which explain a manufacturing process of the electrode lead assembly. Specifically, each of FIGS. 9 and 10 is a state in which electrode leads 111-1 and 111-2 are inserted into slits 300S and then cut along cutting lines B-B', in portions corresponding to the first battery cell 110-1 and the second battery cell 110-2 among the lead frame 300a of FIG. 4.

Referring to FIGS. 8 to 10 together with FIGS. 4 and 6, the manufacturing method of the battery module 100 according to an embodiment of the present disclosure includes a step of stacking a plurality of battery cells 110-1 and 110-2 including electrode leads 111-1 and 111-2 to form a battery cell stack 200; a step of disposing a lead frame 300a on one side of the battery cell stack 200; and a joining step in which a first electrode lead 111-1 protruding from a first battery cell 110-1 among the plurality of battery cells 110-1 and 110-2 and a second electrode lead 111-2 protruding from a second battery cell 110-2 among the plurality of battery cells 110-1 and 110-2 are bent after passing through a slit 300S formed in the lead frame 300a, then overlapped, and at least partially joined to each other to form an electrode lead assembly 110L. The lead frame 300a comprises a first support part 310a on which the electrode lead assembly 110L is located. As described above, the first support part 310a has a shape that is protruded in a direction in which the electrode lead assembly 110L is located or a shape that is recessed in a direction opposite to the direction in which the electrode lead assembly 110L is located.

Specifically, in the joining step, the second electrode lead 111-2 of the second battery cell 110-2 is inserted into one of the slits 300S formed in the lead frame 300a, and then can be bent over the first support part 310a. Also, the joining plate 520 of the sensing assembly 500 may be disposed on the second support part 320a.

Next, the first electrode lead 111-1 of the first battery cell 110-1 can be inserted into the other one of the slits 300S formed in the lead frame 300a, and then bent. At this time, the first electrode lead 111-1 may be bent so as to cover both the joining plate 520 and the second electrode lead 111-2.

As shown in FIG. 8(*c*) and FIG. 9, a second electrode lead 111-2 and a first electrode lead 111-1 may be sequentially located from the bottom on the first support part 310a, and the joining plate 520 and the first electrode lead 111-1 may be sequentially located on the second support part 320a from below.

Next, referring to FIGS. 9 and 10, in the joining step, the first electrode lead 111-1 and the second electrode lead 111-2 are overlapped and joined while being in close contact with the first support part 310a to form the electrode lead assembly 110L. The first support part 310a has an arch shape protruding in a direction in which the first electrode lead 111-1 and the second electrode lead 111-2 are located, or an arch shape recessed in a direction opposite to the direction in which the first electrode lead 111-1 and the second electrode lead 111-2 are located. Thereby, the electrode lead assembly 110L, which is formed in close contact with the first support part 310a, can also have a protruded arch shape or a recessed arch shape like the shape of the first support part 310a.

Meanwhile, in the joining step, a welding jig 600 can be disposed so as to cover a portion of the first electrode lead 111-1 and a portion of the second electrode lead 111-2. The welding jig 600 can be provided with a first recessed part 610a and a second recessed part 620a that are recessed according to the respective shapes of the first support part 310a and the second support part 320a.

Between the lead frame 300a and the welding jig 600, the first electrode lead 111-1 and the second electrode lead 111-2 may be joined to each other while being in close contact with each other. That is, as the welding jig 600 is disposed, the first electrode lead 111-1 and the second electrode lead 111-2 may be deformed into an arch shape so as to correspond to the shape of the first support part 310a between the lead frame 300a and the welding jig 600.

Meanwhile, the first jig opening part 611a of the penetrated shape may be formed in the welding jig 600. The welding device may join the exposed portions of the first electrode lead 111-1 and the second electrode lead 111-2 through the first jig opening part 611a to form the electrode lead assembly 110L. As an example, in a state in which the first electrode lead 111-1 and the second electrode lead 111-2 are in firmly close contact with each other in this way, a laser or the like is sprayed through the first jig opening 611a formed in the welding jig 600 to achieve a welding W between the first electrode lead 111-1 and the second electrode lead 111-2. Thereby, the electrode lead assembly 110L having a shape bent in a protruding manner can be manufactured.

In addition, a second jig opening part 621a having a penetrating shape can be formed in the welding jig 600. As the welding jig 600 is disposed, the first electrode lead 111-1 and the joining plate 520 can be deformed into an arch shape so as to correspond to the shape of the second support part 320a between the lead frame 300a and the welding jig 600. In a state in which the first electrode lead 111-1 and the joining plate 520 are in firmly close contact with to each other in this way, a laser or the like can be sprayed through the second jig opening part 621a formed in the welding jig 600 to achieve a welding W between the first electrode lead 111-1 and the joining plate 520.

As described above, according to the present embodiment, while joining the first electrode lead 111-1 and the second electrode lead 111-2, the first electrode lead 111-1 and the joining plate 520 can be joined at the same time. The conventional battery module 10 joins the electrode lead 11L to the busbar 40 for HV connection, and separately from this, the sensing assembly 50 is connected to the busbar 40. On the other hand, the battery module 100 according to the present embodiment is configured such that the HV connection between the electrode leads and the LV connection between the electrode leads and the sensing assembly can be performed at once without performing the HV connection between the electrode leads and the sensing assembly, thereby expecting an improvement in manufacturing processability. In addition, since a configuration such as a busbar can be eliminated, the battery module 100 having a more compact configuration can be manufactured.

Meanwhile, as described above, a pierced first opening part 311a can be formed in the center of the first support part 310a, and the first opening part 311a may be pierced on a side where the electrode lead assembly 110L is located. When the welding W between the first electrode lead 111-1 and the second electrode lead 111-2 is performed by spraying a laser or the like, damage may be applied to the lead frame 300a.

Therefore, according to the present embodiment, in the joining step, a portion corresponding to a region in which the first opening part 311a is formed among the first electrode lead 111-1 and the second electrode lead 111-2 may be weld-joined to each other. Due to the first opening part 311a, the first support part 310a does not come into contact with a portion where the first electrode lead 111-1 and the second electrode lead 111-2 are welded. That is, when the welding W between the first electrode lead 111-1 and the second electrode lead 111-2 is performed, an attempt was made to minimized damage to the lead frame 300a.

Meanwhile, as described above, joining can be performed in a state in which the first electrode lead 111-1 is in firmly close contact with the second electrode lead 111-2 or the joining plate 520. That is, weld junction can be easily performed without a conventional busbar.

FIG. 11 is a perspective view illustrating a joining plate according to an embodiment of the present disclosure.

Referring to FIGS. 4 and 11, in the joining plate 520 according to an embodiment of the present disclosure, one side 520P is joined to the first electrode lead 111-1, and the other side 520C is connected to a connection member 530.

Specifically, one side 520P of the joining plate 520 is formed in a plate shape, and may be joined by a method such as welding after being closely adhered to the first electrode lead 111-1. Meanwhile, the other side 520C of the joining plate 520 may be coupled to the connection member 530 by being bent after penetrating the connection member 530.

Next, a lead frame according to another embodiment of the present disclosure will be described in detail with reference to FIGS. 12 and 13.

FIG. 12 is a perspective view illustrating a lead frame according to another embodiment of the present disclosure. FIG. 13 is a cross-sectional view illustrating a cross section taken along the cutting line C-C' of FIG. 12. At this time, FIG. 13 illustrates on the assumption that the electrode leads 111-1 and 111-2 of the battery cells 110-1 and 110-2 has passed through the slit 300S of the lead frame 300b for convenience of explanation.

Referring to FIGS. 12 and 13, the first electrode lead 111-1 protruding from the first battery cell 110-1 among the plurality of battery cells 110 and the second electrode lead 111-2 protruding from the second battery cell 110-2 among the plurality of battery cells 110 is bent after passing through the slit 300S formed in the lead frame 300b, and then overlapped to form the electrode lead assembly 110L. In the electrode lead assembly 110L, at least a part of the first electrode lead 111-1 and at least a part of the second electrode lead 111-2 are joined to each other.

The lead frame 300b according to the present embodiment may include a first support part 310b in which the electrode lead assembly 110L is located. Further, the lead frame 300b may include a second support part 320b in which a portion where the first electrode lead 111-1 and the joining plate 520 are joined is located.

At this time, the first support part 310b may have a shape that is recessed in a direction opposite to the direction in which the electrode lead assembly 110L is located. More specifically, the first support part 310b may have an arch shape that is recessed in a direction opposite to the direction in which the electrode lead assembly 110L is located. Thereby, the electrode lead assembly 110L may also be bent so as to be recessed in an arch shape.

Further, the second support part 320b may have a shape that is recessed in a direction opposite to the direction in which the joining plate 520 is located. More specifically, the second support part 320b may have an arch shape that is recessed in a direction opposite to the direction in which the joining plate 520 is located. Thereby, the overlapping portion of the first electrode lead 111-1 and the joining plate 520 may also be bent so as to be recessed in an arch shape.

Taken together, the lead frame 300b according to the present embodiment is different from the lead frame 300a described above in that the first support part 310b and the second support part 320b are in a recessed shape rather than a protruding shape. Thereby, the electrode lead assembly 110L may be bent so as to be recessed rather than protruded. Similarly, the overlapping portion of the first electrode lead 111-1 and the joining plate 520 may be bent such that it is recessed rather than protruded.

Except for this, it may have the same or similar structure as the lead frame 300a described above. For example, the first opening part 311b may be formed in the first support part 310b, and a second opening part 321b may be formed in the second support part 320b. Further, the auxiliary support part 400b may be located in the first opening part 311b. Further descriptions thereof will be omitted since they overlap with those described above. In FIG. 13, both the first open part 311b and the second opening part 321b are shown in a shape in which the side where the battery cells 110-1 and 110-2 are located is pierced. Although not specifically illustrated, in another embodiment of the present disclosure, the first opening part and the second opening part in the form in which the side where the battery cells 110-1 and 110-2 are located are closed are also possible.

Next, a battery module according to a modified embodiment of the present disclosure will be described in detail with reference to FIGS. 14 to 17.

FIG. 14 is an exploded perspective view illustrating a battery module according to a modified embodiment of the present disclosure. FIG. 15 is a cross-sectional view illustrating a cross section taken along the cutting line D-D' of FIG. 14.

Referring to FIGS. 14 and 15, the battery module 100 according to a modified embodiment of the present disclosure includes a battery cell stack 200 in which a plurality of battery cells 110 are stacked, a lead frame 300c and a sensing assembly 500. The sensing assembly 500 may include a module connector 510, a joining plate 520, and a connection member 530, as described above.

The lead frame 300c includes a first support part 310c on which the electrode lead assembly 110L is located. The first support part 310c may have a shape that is protruded in a direction in which the electrode lead assembly 110L is located or a shape that is recessed in a direction opposite to the direction in which the electrode lead assembly 110L is located. As an example, FIG. 15 illustrates the first support part 310c having a structure that is protruded in the direction in which the electrode lead assembly 110L is located.

The first electrode lead 111-1 and the second electrode lead 111-2 are overlapped on the first support part 310c to form an electrode lead assembly 110L, wherein the electrode lead assembly 110L has a shape corresponding to the shape of the first support part 310c on the first support part 310c. That is, the electrode lead assembly 110L according to the present embodiment may be bent so as to correspond to the first support part 310c having a shape protruding in the direction in which the electrode lead assembly 110L is located.

At this time, the joining plate 520 may be located on the first support part 310c and joined to the electrode lead assembly 110L. Also, the joining plate 520 may have a shape corresponding to the shape of the first support part 310c on the first support part 310c. That is, in the present embodiment, the first electrode lead 111-1, the second electrode lead 111-2, and the joining plate 520 are joined together on the first support part 310c, all of which can be bent to correspond to the shape of the first support part 310c.

It can have the same or similar structure as the above-mentioned lead frame, except that the joining plate 520 is joined to the electrode lead assembly 110L on the first support part 310a. For example, the first opening part 311c may be formed in the first support part 310c. In FIG. 15, the first opening part 311c is shown in a form in which the side where the battery cells 110-1 and 110-2 are located is pierced, but a form, in which the side where the battery cells 110-1 and 110-2 are located is closed, is also possible.

FIG. 16 is a plan view which explains a manufacturing process of an electrode lead assembly according to a modified embodiment of the present disclosure. Specifically, FIG. 16(*a*) to FIG. 16(*c*) are a state in which the lead frame 300c of FIG. 15 is viewed in the −x-axis direction on the yz plane.

Referring to FIGS. 15 and 16, the second electrode lead 111-2 of the second battery cell 110-2 is inserted into one of the slits 300S formed in the lead frame 300c and then can be bent over the first support part 310c.

Next, the first electrode lead 111-1 of the first battery cell 110-1 is inserted into the other one of the slits 300S formed in the lead frame 300c, and then can be bent. As shown in FIG. 15 and FIG. 16(*b*), the first electrode lead 111-1 can be bent so as to cover the second electrode lead 111-2 on the first support part 310c.

Next, the joining plate 520 of the sensing assembly 500 may be placed on the first electrode lead 111-1. In particular, the joining plate 520 may be located at a portion corresponding to the first support part 310c.

The first electrode lead 111-1, the second electrode lead 111-2, and the joining plate 520 can be welded at the same time. The first electrode lead 111-1, the second electrode lead 111-2, and the joining plate 520 may be welded at once by spraying a laser beam in a state in which they are in close contact with the first support part 310c. Through these steps, as shown in FIG. 15, the configuration of the joining plate 520 joined to the electrode lead assembly 110L on the first support part 310c can be manufactured. The present embodiment has the process advantage that the HV connection between the electrode leads and the LV connection between the electrode leads and the sensing assembly can be performed together by one welding.

FIG. 17 is a plan view which explains a manufacturing process of an electrode lead assembly according to another embodiment of the present disclosure.

Referring to FIG. 17, junction of the first electrode lead 111-1', the second electrode lead 111-2, and the joining plate 520 may be performed on the first support part 310c. However, unlike the case shown in FIG. 16, a recessed side L may be formed in the first electrode lead 111-1'. Thereby, the first electrode lead 111-1' is joined while covering the second electrode lead 111-2, but the joining plate 520 can be joined to the second electrode lead 111-2 instead of the first electrode lead 111-1'. As an example, the second electrode lead 111-2 may be a lead including copper (Cu), and the joining plate 520 has excellent weldability with the lead containing copper. Therefore, in the present embodiment, by forming the recessed side L in the first electrode lead 111-1', the joining plate 520 was configured to be joined to the second electrode lead 111-2 having excellent weldability.

FIG. 18 is a perspective view illustrating a lead frame according to another embodiment of the present disclosure.

Referring to FIG. 18, the first support part 310' of the lead frame 300' according to another embodiment of the present disclosure can be formed by attaching at least one of a metal plate or a spring member to the lead frame 300'. As an example, the first support part 310' may be formed by attaching a bent metal plate to the lead frame 300'. That is, the lead frames 300a and 300b themselves are not protruded or recessed like the first support parts 310a and 310b described above, ft, but a separate recessed metal plate is attached to the lead frame 300' to form the first support part 310'. A metal plate bent in a protruded or indented manner is attached to a lead frame 300', so that the first support part 310' having a protruded or recessed structure can be provided.

FIG. 19 is a perspective view illustrating a lead frame according to another embodiment of the present disclosure.

Referring to FIG. 19, the first support part 310" of the lead frame 300" according to another embodiment of the present disclosure can be formed by attaching a bent spring member to the lead frame 300". That is, the lead frames 300a and 300b themselves are not protruded or recessed like the first support parts 310a and 310b described above, but a separate bent spring member can be attached to the lead frame 300" to form the first support part 310". A spring member in a state bent in a protruded or recessed manner is attached to the lead frame 300", so that the first support part 310" having a protruded or indented structure can be provided.

Meanwhile, although not specifically illustrated, the battery module according to an embodiment of the present disclosure may include a module frame and an end plate that can house the battery cell stack 200. Specifically, the battery module may be manufactured by housing the battery cell stack 200 and the lead frame 300*a* in an inner space of the module frame and then joining the module frame and the end plate.

Even though the terms indicating directions such as front, rear, left, right, upper and lower directions are used herein, it is obvious to those skilled in the art that these merely represent relative positions for convenience in explanation and may vary depending on a position of an observer, a position of an object, or the like.

The one or more battery modules according to the present embodiment as described above can be mounted together with various control and protection systems such as a battery management system (BMS) and a cooling system to form a battery pack.

The battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although preferred embodiments of the present disclosure have been described in detail above, the scope of the present disclosure is not limited thereto, and various modifications and improvements can be designed by those skilled in the art using the basic concepts of the present disclosure defined in the following claims, which also falls within the spirit and scope of the present disclosure.

The invention claimed is:

1. A battery module comprising:
   a battery cell stack in which a plurality of battery cells are stacked; and
   a lead frame located on one side of the battery cell stack,
   wherein a first electrode lead protruding from a first battery cell among the plurality of battery cells and a second electrode lead protruding from a second battery cell among the plurality of battery cells are bent after passing through a corresponding slit in the lead frame and then overlapped to form an electrode lead assembly,
   wherein, in the electrode lead assembly, at least a part of the first electrode lead and at least a part of the second electrode lead are joined to each other,
   wherein the lead frame comprises a first support part on which the electrode lead assembly is located, the first support part having a shape that is recessed in a direction opposite to the direction in which the electrode lead assembly is located, and
   wherein at least a part of the electrode lead assembly is in close contact with one surface of the first support part.

2. The battery module according to claim 1, wherein:
   the first support part has an arch shape that is recessed in the direction opposite to the direction in which the electrode lead assembly is located.

3. The battery module according to claim 1, wherein:
   a first opening part is located in a center of the first support part, and
   the first opening part is open on a side where the electrode lead assembly is located.

4. The battery module according to claim 3, wherein:
   the lead frame comprises an auxiliary support part crossing the first opening part, and
   the auxiliary support part has recessed shape in correspondence to the shape of the first support part.

5. The battery module according to claim 1, wherein:
   the first support part is at least one of a metal plate or a spring member attached to the lead frame.

6. The battery module according to claim 1, further comprising a sensing assembly located on the lead frame, the sensing assembly comprising:
   a module connector;
   a joining plate joined to at least one of the first electrode lead or the second electrode lead; and
   a connection member connecting the module connector and the joining plate.

7. The battery module according to claim 6, wherein:
   the lead frame comprises a second support part on which the first electrode lead and the joining plate are located,
   the second support part has a shape that is recessed in a direction opposite to the direction in which the joining plate is located, and
   at least a part of a portion in which first electrode lead and the joining plate are overlapped is in contact with one surface of the second support part.

8. The battery module according to claim 7, wherein:
   in the second support part, the first electrode lead and the joining plate are joined to each other.

9. The battery module according to claim 7, wherein:
   the second support part has an arch shape that is recessed in the direction opposite to the direction in which the joining plate is located.

10. The battery module according to claim 7, wherein:
    a second opening part is located in a center of the second support part, and
    the second opening part is open on a side where the joining plate is located.

11. The battery module according to claim 6, wherein:
    the joining plate is located on the first support part and is joined to the electrode lead assembly.

12. The battery module according to claim 11, wherein:
    at least a part of the joining plate is in contact with the electrode lead assembly.

13. The battery module according to claim 11, wherein:
    on the first support part, the first electrode lead is joined while covering the second electrode lead to form the electrode lead assembly,
    a recessed side is located in the first electrode lead, and
    the joining plate is joined to the second electrode lead by the recessed side.

14. A method of manufacturing a battery module, the method comprising:
    a step of stacking a plurality of battery cells to form a battery cell stack;
    a step of disposing a lead frame on one side of the battery cell stack; and
    a joining step in which a first electrode lead protruding from a first battery cell among the plurality of battery cells and a second electrode lead protruding from a second battery cell among the plurality of battery cells are bent after passing through a corresponding slit in the lead frame, then overlapped, and at least partially joined to each other to form an electrode lead assembly,
    wherein the lead frame comprises a first support part on which the electrode lead assembly is located, the first support part having a shape that is recessed in a direction opposite to the direction in which the electrode lead assembly is located, and wherein, in the joining step, the first electrode lead and the second electrode lead are overlapped and joined while being in contact with the first support part to form the electrode lead assembly.

15. The method according to claim 14, wherein:

the first support part has an arch shape that is recessed in the direction opposite to the direction in which the first electrode lead and the second electrode lead are located.

16. The method according to claim 14, wherein:

in the joining step, a welding jig is disposed so as to cover a part of the first electrode lead and a part of the second electrode lead, and between the lead frame and the welding jig, the first electrode lead and the second electrode lead are joined while being in contact with each other.

17. The method according to claim 16, wherein:

a first jig opening part is located in the welding jig, and a welding device joins a part where the first electrode lead and the second electrode lead are exposed through the first jig opening part to form the electrode lead assembly.

18. The method according to claim 14, wherein:

a first opening part is located in a center of the first support part, the first opening part is open on a side where the electrode lead assembly is located, and in the joining step, a portion corresponding to a region in which the first opening part is located among the first electrode lead and the second electrode lead is weld-joined to each other to form the electrode lead assembly.

* * * * *